United States Patent
Liu et al.

(10) Patent No.: US 7,299,140 B2
(45) Date of Patent: Nov. 20, 2007

(54) METHOD AND SYSTEM FOR MULTI-PATH ULTRASONIC FLOW MEASUREMENT OF PARTIALLY DEVELOPED FLOW PROFILES

(75) Inventors: Fenghua Liu, College Station, TX (US); Michael Masterov, Houston, TX (US); Prakash Mistry, Sugar Land, TX (US)

(73) Assignee: Thermo Fisher Scientific Inc., Sugar Land, TX (US)

( * ) Notice: Subject to any disclaimer, the term of this patent is extended or adjusted under 35 U.S.C. 154(b) by 0 days.

(21) Appl. No.: 11/300,128

(22) Filed: Dec. 14, 2005

(65) Prior Publication Data

US 2007/0136008 A1    Jun. 14, 2007

(51) Int. Cl.
    *G01F 1/00*    (2006.01)
(52) U.S. Cl. .......................... 702/45; 702/48
(58) Field of Classification Search ............. 702/45, 702/48, 50, 100, 182; 73/861.18, 861.25, 73/861.27, 861.28
    See application file for complete search history.

(56) References Cited

U.S. PATENT DOCUMENTS

| | | | |
|---|---|---|---|
| 4,078,428 A | 3/1978 | Baker et al. | |
| 4,517,847 A | 5/1985 | Miller | |
| 4,856,321 A * | 8/1989 | Smalling et al. | ......... 73/40.5 A |
| 5,987,997 A | 11/1999 | Roskam | |
| 6,047,602 A * | 4/2000 | Lynnworth | .................. 73/632 |
| 6,067,861 A | 5/2000 | Shekarriz et al. | |
| 6,378,357 B1 | 4/2002 | Han et al. | |
| 6,647,806 B1 | 11/2003 | Estrada et al. | |

OTHER PUBLICATIONS

Partial European Search Report dated May 4, 2007, issued in related European Application No. EP-06125459.5-1234 (4 pages).

* cited by examiner

*Primary Examiner*—Bryan Bui
(74) *Attorney, Agent, or Firm*—Osha Liang LLP

(57) ABSTRACT

A method for determining a velocity of a flowing fluid includes estimating a Reynolds number for the flowing fluid; comparing the estimated Reynolds number with a selected range; and determining the velocity of the flowing fluid based on a flow model selected from a laminar flow model, a turbulent flow model, and a partial laminar flow model. An ultrasonic flow meter includes a plurality pairs of transducers configured to form a plurality of measurement paths in a pipe, wherein the plurality of measurement paths are arranged asymmetrically relative to a centerline of the pipe.

19 Claims, 10 Drawing Sheets

(A)

(B)

METHOD AND SYSTEM FOR MULTI-PATH ULTRASONIC FLOW MEASUREMENT OF PARTIALLY DEVELOPED FLOW PROFILES

BACKGROUND OF INVENTION

1. Field of the Invention

The invention relates generally to flow rate measurement methods and systems. In particular, embodiments relate to multi-path ultrasonic measurement of partially developed flow profiles.

2. Background Art

In industries where a flow of fluid is involved, accurate measurements of flow rates are often required. For example, in the oil and gas industry, accurate flow rate measurements are needed in custody transfer (the transfer of ownership, for example at a crude oil loading and off-loading station), leak detection, and process control applications. Conventional flow measurement technologies include turbine flow meters and positive displacement flow meters. Recently, multi-channel ultrasonic meters are gaining shares in this market due to their advantages over conventional technologies. These advantages include: excellent long-term repeatability, less sensitivity to fluid properties such as viscosity and pressure, better open-box accuracy, wider range of linearity, and lower cost of maintenance due to the fact that no moving parts are used in these ultrasonic meters.

In a typical operation, an ultrasonic flow meter uses a transducer to transmit an ultrasonic beam into the flow stream, and the ultrasonic energy is received by a second transducer. The flow carrying the ultrasonic wave alters the wave's frequency (Doppler effect) and transit time (velocity superposition), and these two quantities can be measured to determine the flow rate. Based on these principles, two major ultrasonic flow measurement technologies exist: Doppler and transit-time. In some configurations of flow meters, transducers are clamped on the outside wall of a pipe. To achieve better measurement accuracy, transducers may be alternately placed inside the pipe wall, and such transducers are referred to as "wetted" transducers. Some methods to measure flow profiles have been developed, mostly based on Doppler technology (e.g., U.S. Pat. Nos. 6,067,861, 6,378,357). However, Doppler signals rely heavily on particle size and concentration that sometimes may vary and lead to poor repeatability. It is widely accepted in the industry that only multi-path transit-time meters combined with wetted transducers are capable of high accuracy applications mentioned above.

The principles of transit-time ultrasonic measurements are well established. According to the an America Petroleum Institute (API) standard (API H00008, Manual of Petroleum Measurement Standards, Measurement of Liquid Hrdrocarbons by Ultrasonic Flowmeters Using Transit Time), an average velocity along an ultrasonic path can be derived from:

$$V_i = \frac{L}{2\cos\theta} * \frac{t_2 - t_1}{t_1 * t_2} \tag{1}$$

where $V_i$ is a path-average flow velocity (i.e., an average of velocities along a particular ultrasonic path) for the path i, L is the ultrasonic path length, $\theta$ is the angle between the ultrasonic path and the fluid velocity vector, and $t_1$ and $t_2$ are the ultrasonic travel times in and against the flow direction, respectively.

It should be noted that the measured path-average velocity $V_i$ is different from the flow-average velocity $V_{avg}$, the latter being the velocity averaged over the flow cross section. $V_i$ is directly measured from an ultrasonic transit-time flow meter using Equation (1), while $V_{avg}$ gives the flow rate that is important in applications such as custody transfer. A ratio $K_i$ between these two velocities can be defined as:

$$K_i = \frac{V_{avg}}{V_i}, \tag{2}$$

and is referred to as the channel factor. In the following description, $V_i$ is referred to as the path velocity, and $V_{avg}$ is referred to as the average velocity.

Pipe flows mostly run in one of the two modes: the laminar mode and the turbulent mode. Widely accepted mathematical models for these flow modes are:

$$V(r) = V_c * \left(1 - \frac{r^2}{R^2}\right), \text{ for laminar flow} \tag{3}$$

$$V(r) = V_c * \left(1 - \frac{r}{R}\right)^{\frac{1}{N}}, \tag{4}$$

for turbulent flow in smooth-wall pipes where $V(r)$ is the velocity at a distance r from the pipe centerline, R is the pipe radius, $V_c$ is the flow velocity along the pipe centerline, and N is a power-law factor.

The power-law factor N is a characteristic value of a turbulent flow. For a fully developed turbulent flow, the power-law factor N can be estimated using an empirical equation described in the literature (e.g., L. Lynnworth, "Ultrasonic Measurement for Process Control", Academic Press, San Diego, 1989):

$$N = 1.66 * \log Re \tag{5}$$

where Re is the Reynolds number, which is a function of the flow velocity V and the fluid viscosity $\mu$:

$$Re = \frac{DV\rho}{\mu}, \tag{6}$$

where D is the pipe diameter, and p is the fluid density.

In real-world applications, the pipe and the fluid conditions often cannot be precisely quantified, and Equations (5) and (6) generally cannot be used to obtain N in high-accuracy measurements. Hence, for a given turbulent flow, at least two measurements at two flow paths are needed in order to solve Equation (4) for the two unknowns, N and $V_c$. This is why a multi-path ultrasonic technology is often needed to resolve flow profile variations.

Referring to FIG. 1A, a pipe 1 is shown with three pairs of transducers, 11a and 11b, 12a and 12b, 13a and 13b. An arrow 2 shows the flow direction. The lines between transducer pairs show their ultrasonic paths. In this configuration, the ultrasonic path between 11a and 11b crosses the pipe centerline, and is referred to as a diagonal path. The shortest distance from a path to the pipe centerline is referred to as channel level. A diagonal path has a channel level of 0. The path between 12a and 12b and the path between 13a and 13b have the same channel levels h even though the two transducer pairs are at different locations. FIG. 1A also illustrates an exemplary flow profile 3.

The channel factor $K_i$ depends on flow profiles and the position of the ultrasonic path. For a diagonal ultrasonic path the channel factor is:

$$0.75, \text{ for a laminar flow; and} \qquad (7)$$

$$\frac{\int_0^R \left(1 - \frac{r}{R}\right)^{\frac{1}{N}} * 2 * r * dr}{R * \int_0^R \left(1 - \frac{r}{R}\right)^{\frac{1}{N}} * dr}, \text{ for a turbulent flow.}$$

Referring to FIG. 1B, the channel factor K (vertical axis) is shown as a function of Reynolds number Re (horizontal axis) in a case of a diagonal ultrasonic path. For non-diagonal ultrasonic paths, the K values can also be derived in a similar way. The relation between K value and path positions has been well studied for the laminar flow and the turbulent flow profiles, dating back to a 1978 U.S. Pat. No. 4,078,428. Hence, for both laminar flow and turbulent flow profiles, the relations between measured velocities and the actual average velocities are well defined.

A major challenge for ultrasonic meters is to detect a flow profile promptly based on information from a limited number of paths. For a turbulent flow, the randomness of measured path velocities in selected paths can result in instant deviation as high as 10 percent from the average values, and the small number of paths makes it difficult to obtain a satisfactory statistical average flow velocity. Unlike turbine meters that inherently average out the whole cross section of a flow, transit-time ultrasonic flow meters only measure a limited number of selected paths of flow velocity. To average out randomness of the measured velocities, ultrasonic meters need to have either a large damping on the raw data or more paths distributed across a flow profile. Using a large damping will adversely affect the system response time and result in poor repeatability when measuring a small volume. On the other hand, adding more channels to measure more paths may substantially increase the system cost.

A more challenging problem for ultrasonic flow meters is to detect a partially developed flow profile. A fully developed flow profile, by definition, is a flow velocity distribution pattern that does not change along a pipe. Any other flow profiles that have symmetric velocity distributions around the pipe centerline, but with a evolving flow velocity distribution along the pipe, are in this description referred to as partially developed flow profiles. There are two possible causes for partially developed flow profiles. One is a transitional profile between turbulent and laminar flows that can happen in high-viscosity fluids. Another is due to the presence of a flow conditioning device that does not have enough downstream length for the profile to fully develop.

The transition between a turbulent flow and a laminar flow normally takes place when the Reynolds number is around 2300 and has been demonstrated by numerous experiments. However, as illustrated in FIG. 1B, this transition can happen in a wide range of Reynolds numbers and can have memory effects, depending on fluid and pipe conditions. As a result, it is not accurate to use the Reynolds number as a sole indicator of a flow profile mode. A partially developed profile near the transition range may cause an unacceptably poor repeatability in flow measurements, as neither the laminar nor the turbulent model fits the profile well.

As a known fact, a steady profile needs some straight, obstruction-free distance in the pipe to fully develop. Referring to FIG. 2, a plug flow 21, which has a constant velocity throughout the cross section of the pipe 23 having a diameter D, enters the pipe 23 from a much larger pipe 22. The flow initially has a partially developed profile 24. After an entrance length 25, the flow has a fully developed profile 26. Both theories and experiments indicate that the entrance length 25 needs to be as long as 100 times the pipe diameter D for a laminar profile to fully develop, and 80 times the pipe diameter D for a turbulent profile to fully develop (see, R. W. Fox and A. T. McDonald, "Introduction to Fluid Mechanics", $3^{rd}$ ed., John Wiley and Sons, New York, 1992). In practice, entrance flow rarely has a form of a plug profile, and a straight length of 10 to 15 times the pipe diameter D is commonly recommended by meter manufactures to have a predictable measurement of flow profiles.

For a multi-path custody-transfer flow meter, it is a common practice to have a flow conditioning device installed upstream of the flow meter. The main purpose of the flow conditioning device is to reduce swirls and to reduce asymmetric profile distortion. A shorter flow conditioning installation distance is always beneficial for manufacturers and customers. U.S. Pat. No. 6,647,806 also suggests that a shorter distance between a flow conditioning device and a flow meter can improve the repeatability of measurements.

Referring to FIG. 3, which shows an API recommended flow conditioning device 31, made of a bundle of small tubes having a length B, is installed in the pipe 32 at a distance A from the pipe entrance. The distance C downstream of the flow conditioning device 31, is recommended to be at least 5 times the diameter D of the pipe 32. The device 31 tends to smooth out a flow profile. As a result, the presence of the device 31 will either disturb a laminar profile, or flatten a turbulent profile. In either case, within a limited entrance distance, a typical flow profile (i.e., laminar flow or turbulent flow) may not fully develop. In particular, downstream of the conditioning device, turbulent flow may have a much higher N number than that estimated using equation (5), and turbulent-laminar transition can happen at a Reynolds number much lower than 2300. In either case, the flow profile will be unpredictable based on the Reynolds number. What are still needed are improved systems and methods for monitoring partially developed flow profiles in real time.

SUMMARY OF INVENTION

In one aspect, embodiments disclosed herein relate to a method for determining a velocity of a flowing fluid, comprising: estimating a Reynolds number for the flowing fluid; comparing the estimated Reynolds number with a selected range; and determining the velocity of the flowing fluid based on a flow model selected from a laminar flow model, a turbulent flow model, and a partial laminar flow model.

In another aspect, embodiments disclosed herein relate to an ultrasonic flow meter comprising a plurality pairs of transducers configured to form a plurality of measurement paths in a pipe. The plurality of measurement paths are arranged asymmetrically relative to a pipe centerline.

Other aspects and advantages of the invention will become apparent from the following description and the attached claims.

It is to be understood that the drawings are to be used for the purpose of illustration only, and not as a definition of the metes and bounds of the invention, or as a basis for reading non-existent or un-recited limitations into the claims.

DETAILED DESCRIPTION

In one aspect, some embodiments disclosed herein relate to methods that can be used to measure flow rates even in the presence of partially-developed flow profiles, caused either by a flow conditioning device or by a laminar-turbulent profile transition. Embodiments of the invention may include some or all of the following components: (1) a partial laminar flow profile model that addresses the uncertain phase during the laminar-turbulent transition; (2) a profile searching and fitting algorithm that covers a large range of profiles; (3) a combination of ultrasonic paths having different channel levels to a pipe centerline.

In another aspect, some embodiments disclosed herein relate to methods and multi-path ultrasonic flow meter systems that can accurately measure partially developed flow profiles. A system in accordance with one embodiment of the invention may include a cylindrical ultrasonic spool piece that has two or more ultrasonic paths having distinctive channel levels. Some embodiments may also include a flow conditioning device that removes most of the swirls and asymmetric flow components. A method of the invention may use a partial laminar model that better represents a flow profile partially developed after a flow conditioning device, especially, at a low Reynolds number. A method of the invention may also use an algorithm that searches for best fit of a detected profile to a laminar flow, a partial laminar flow, or a turbulent flow profile.

Figure 1A:
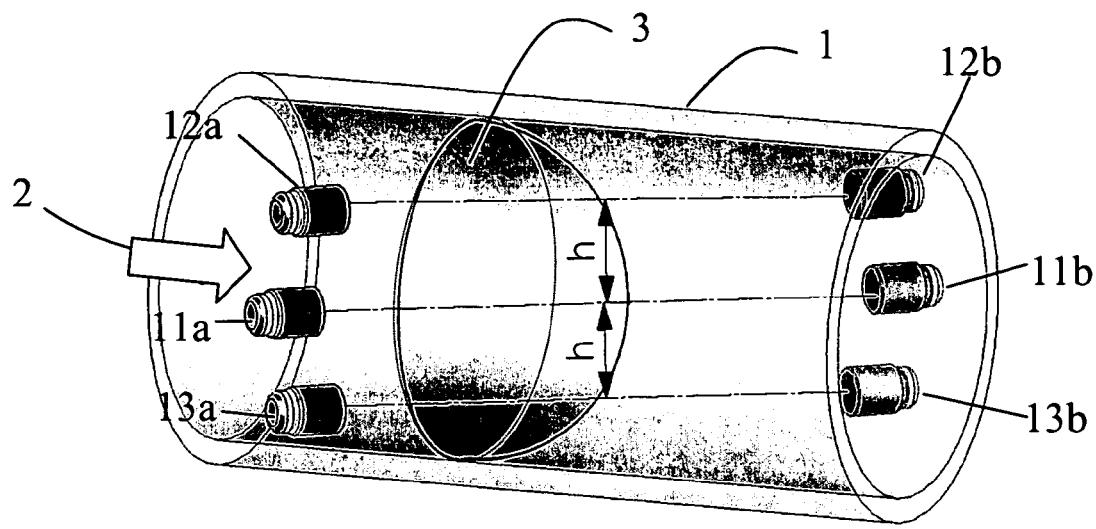
FIG. 1A shows a configuration of a prior art multi-path ultrasonic transit-time flow meter.
Figure 1B:
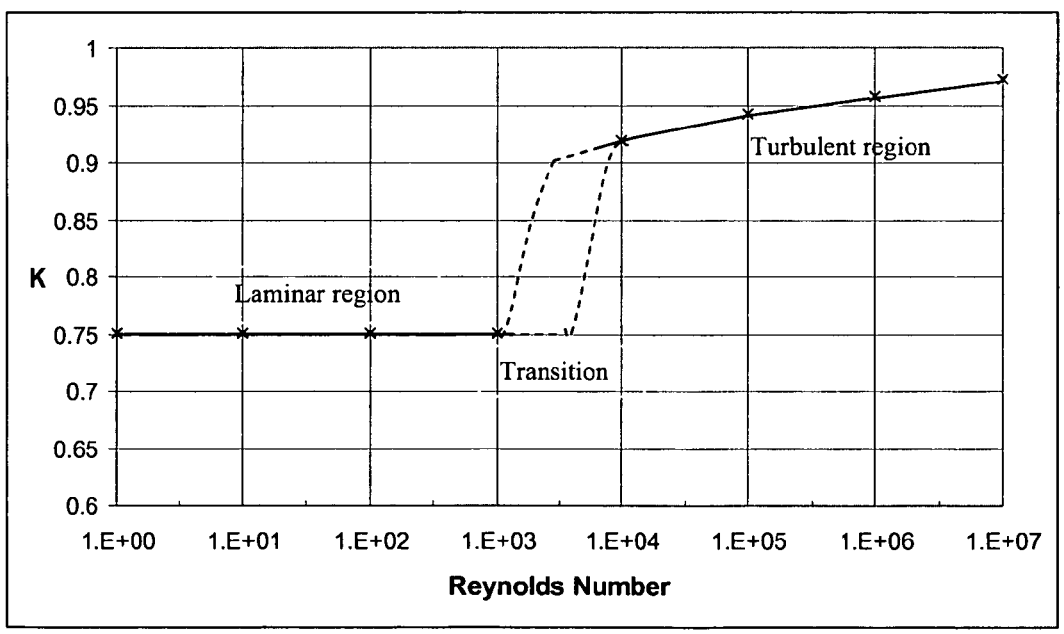
FIG. 1B shows a chart illustrating K values for a diagonal ultrasonic path at different Reynolds numbers Re.
Figure 2:
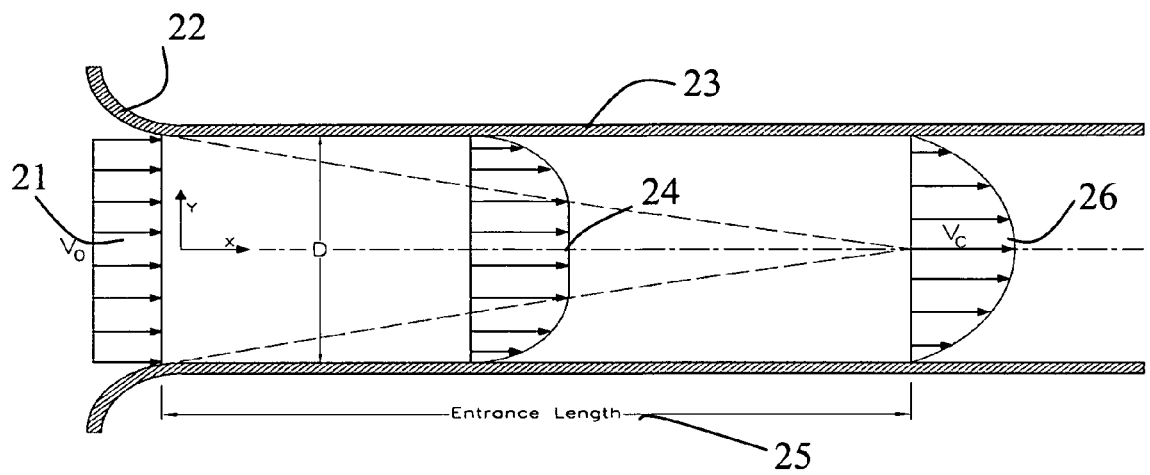
FIG. 2 shows a process where a certain entrance length is required for a flow velocity profile to fully develop.
Figure 3:
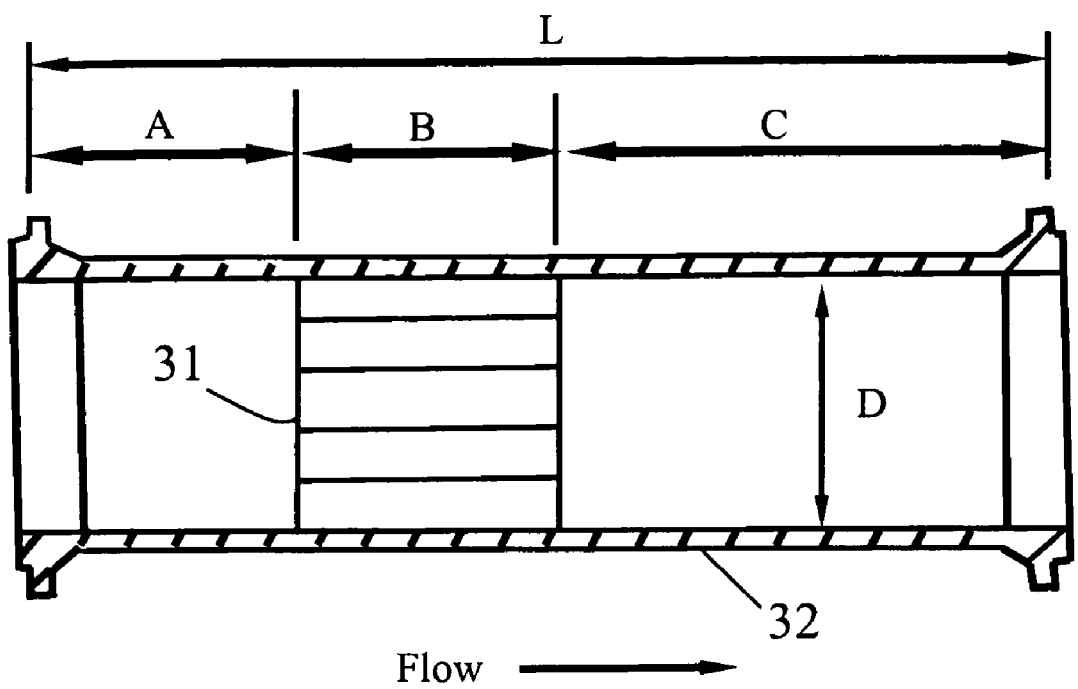
FIG. 3 illustrates an API recommended flow conditioning device.
Figure 4A:
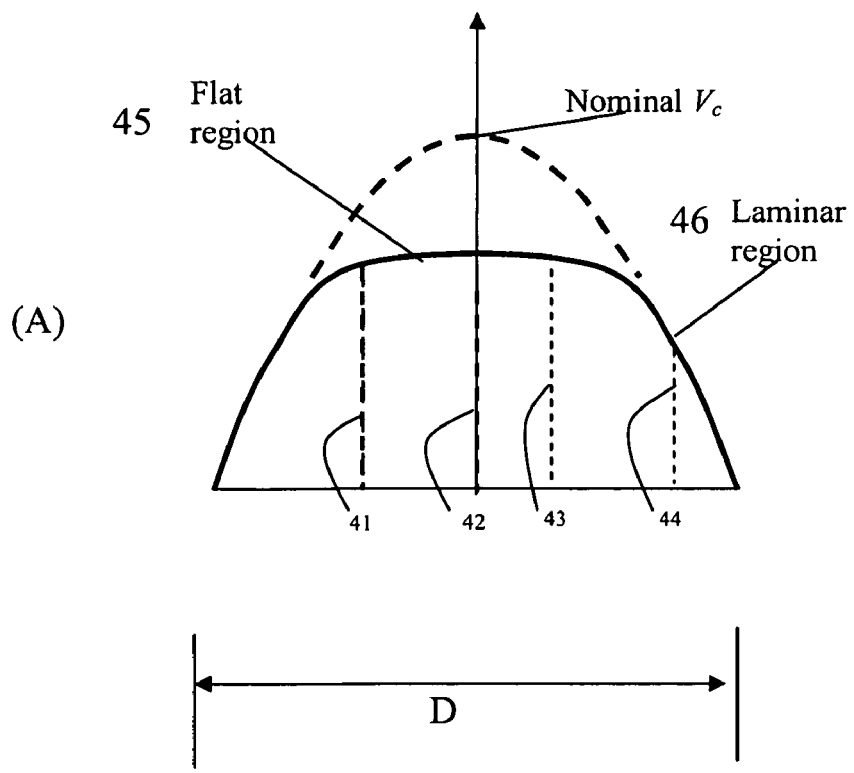
FIGS. 4A and 4B show a partial laminar flow profile model in accordance with one embodiment of the present invention.
Figure 4B:
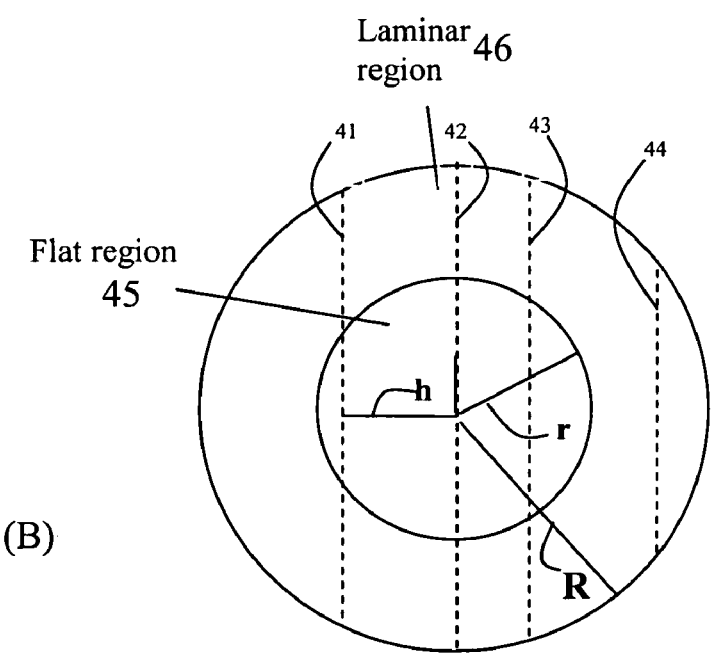

A partial laminar flow profile model in accordance to one embodiment of the invention is illustrated in FIGS. 4A and 4B. FIG. 4A shows a view of a cross section along the pipe centerline. The pipe has a diameter D. Dashed lines 41-44 represent the projected positions of four ultrasonic paths. The flow velocity profile may be divided into two regions: a laminar region 46 and a flat region 45. $V_c$ is the centerline velocity if the laminar flow profile is fully developed. The flattening of the central flow profile that deviates from a laminar flow (the dashed curve in FIG. 4A) may be a result of the laminar flow passing through a flow conditioning device. Consequently, the set of measured path velocities in this situation will not fit a pure laminar flow profile model very well.

Ideally, after traveling a sufficient distance downstream of the flow conditioning device, the laminar flow will rebuild from the pipe wall vicinity and the flat region will shrink and gradually disappear. However, in real-world applications, the distance between the flow conditioning device and the flow meter may not be long enough for the laminar profile to fully develop, and the ultrasonic beams would have to go through a partially-developed laminar profile similar to the ones presented in FIG. 4A.

FIG. 4B shows the cross sectional view in a plane perpendicular to the flow direction. In this model of a partially-developed laminar flow profile, the flat region 45 has a radius r from the pipe center line. A partial laminar factor d is defined as the percentage of the flat region in the pipe having a radius R, i.e., d=r/R. The partial laminar factor is an unknown and needs to be solved during flow measurements when the Reynolds number is close to a transition point.

The position of a specific path is characterized by a channel level h, which is the shortest distance from the center point of a path to the pipe centerline. Referring back to FIG. 4A, the channel level of the path 41 does not equal the channel level of the path 43 nor the channel level of the path 44, indicating that paths 41, 43, and 44 are asymmetrically distributed around the pipe centerline.

Similarly, when a turbulent flow passes through a conditioning device the downstream length may not be enough for the turbulent profile to fully re-develop. The flattened profile will still be a turbulent profile but has a higher power law factor N than that estimated from the Reynolds number. Again, a fast and wide-range profile searching method is needed to solve the two unknowns: the center velocity $V_c$ and the power law factor N.

Some embodiments of the invention relate to a profile searching and fitting algorithm. An algorithm in accordance with embodiments of the invention is suitable for all profiles, including partially developed profiles. As mentioned above, laminar flows and turbulent flows occur in certain Reynolds number ranges. An algorithm in accordance with embodiments of the present invention has little dependence on particular Reynolds numbers. Instead, the algorithm has three large search ranges: pure laminar, transitional, and turbulent. In the transitional range, laminar, partially-developed laminar, and turbulent flow profiles are all test-fitted and the best fit is used as the profile model. This algorithm requires intensive computation, especially when a lot of iterations of integral calculations are involved.

As mentioned above, for a known ultrasonic path and a known flow profile, a channel factor K relates the path velocity and the average velocity. In order to derive the average velocity from the measured path velocity, it is necessary to first derive the channel factor K for the particular path. In accordance with some embodiments of the invention, a program may be used to generate a database of channel factor K as functions of channel levels h, power-law factors N, and partial laminar factor r/R. The database can then be used as a lookup table to quickly identify, for a known channel level h, relationships between the channel factor K and the power law factor N or the partial laminar factor r/R.

Figure 5:
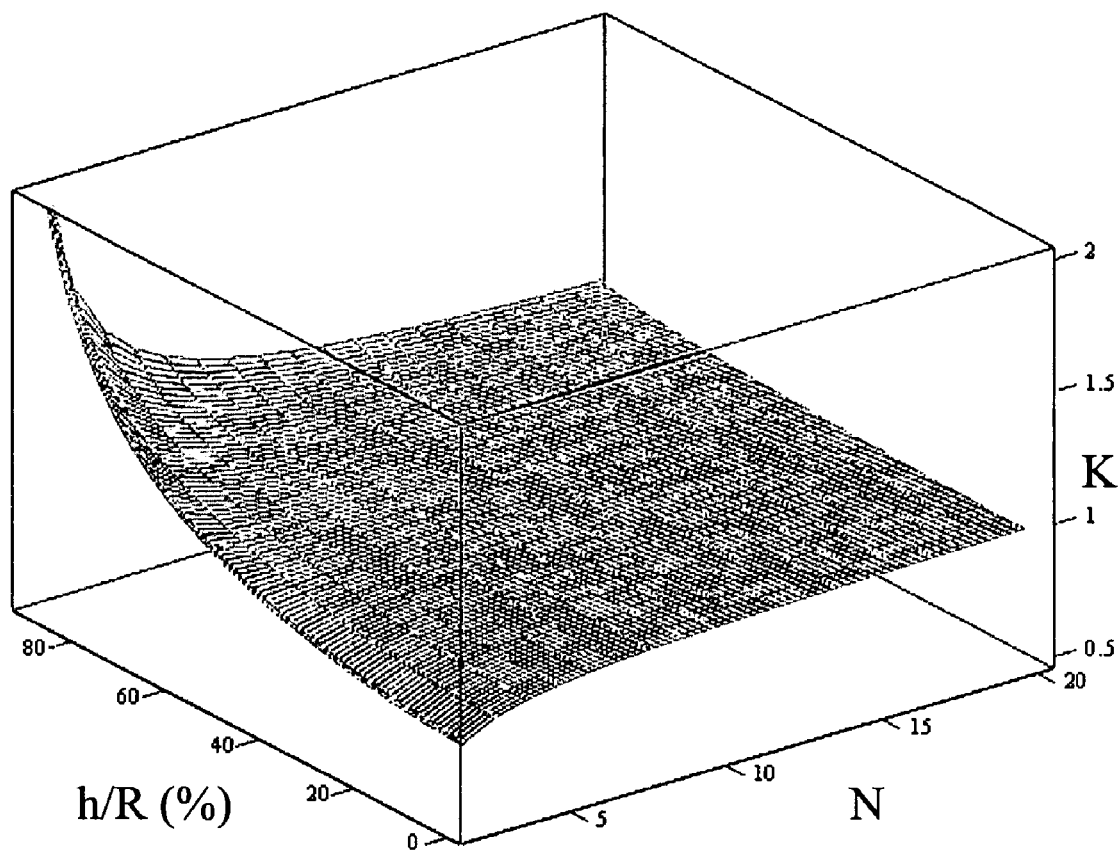
FIG. 5 shows a pre-computed two-dimensional K value curve for turbulence flows.
Figure 6:
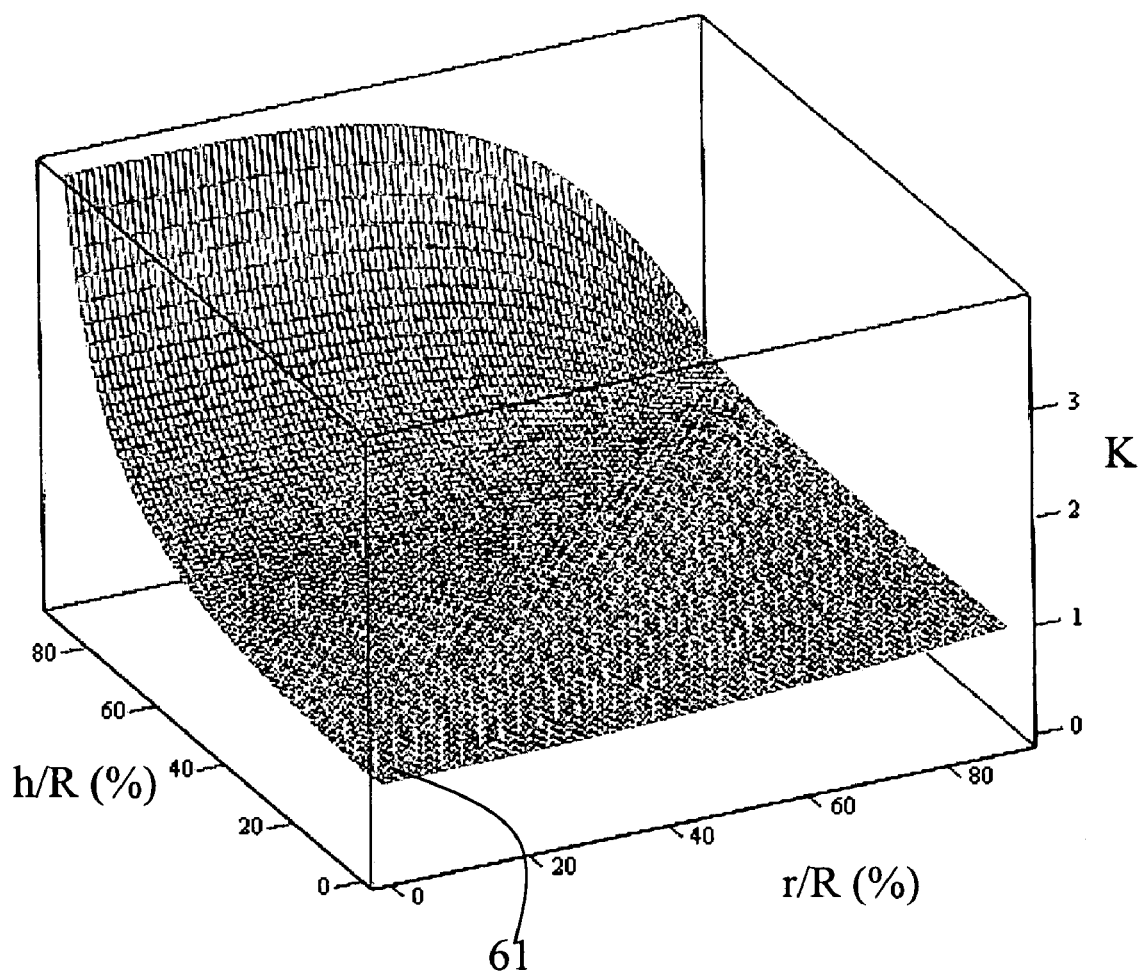
FIG. 6 shows a pre-computed two-dimensional K value curve for partial laminar flows.

Referring to FIG. 5, for a turbulent flow or partially developed turbulent flow, channel factors K for all possible combinations of channel levels h (in the form of a percentage of the pipe radius R) and power-law factors N are pre-computed and put into two-dimensional data arrays. Similarly, FIG. 6 shows, for a partially developed laminar flow, two-dimensional arrays of the K factors as functions of r/R and h/R. It can be seen that a pure laminar flow is a special case of a partial laminar flow when the radius of the flat region r is zero. For example, referring to FIG. 6, when the flat region does not exist (r/R=0), and when the ultrasonic path is diagonal (h/R=0), the K factor of the data point 61 has a value of 0.75.

The two-dimensional channel factor arrays shown in FIG. 5 and FIG. 6 universally characterize flow measurements using ultrasonic paths. These K values may be saved as lookup tables in a database as part of a flow meter computer program. During a meter configuration stage, a set of channel levels h are derived from the positions of the transducer pairs. The program then looks up $K_i$ function curves from the lookup tables for each ultrasonic path i.

Figure 7:
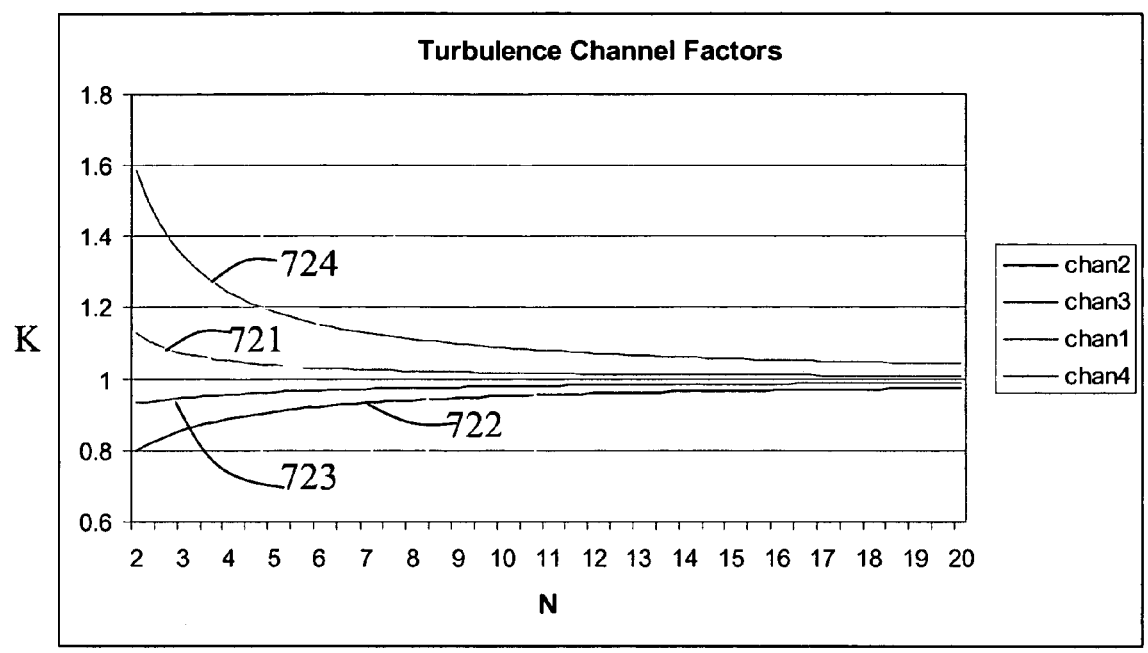
FIG. 7 shows a set of derived one-dimensional turbulent flow K curves in accordance with one embodiment of the present invention.
Figure 8:
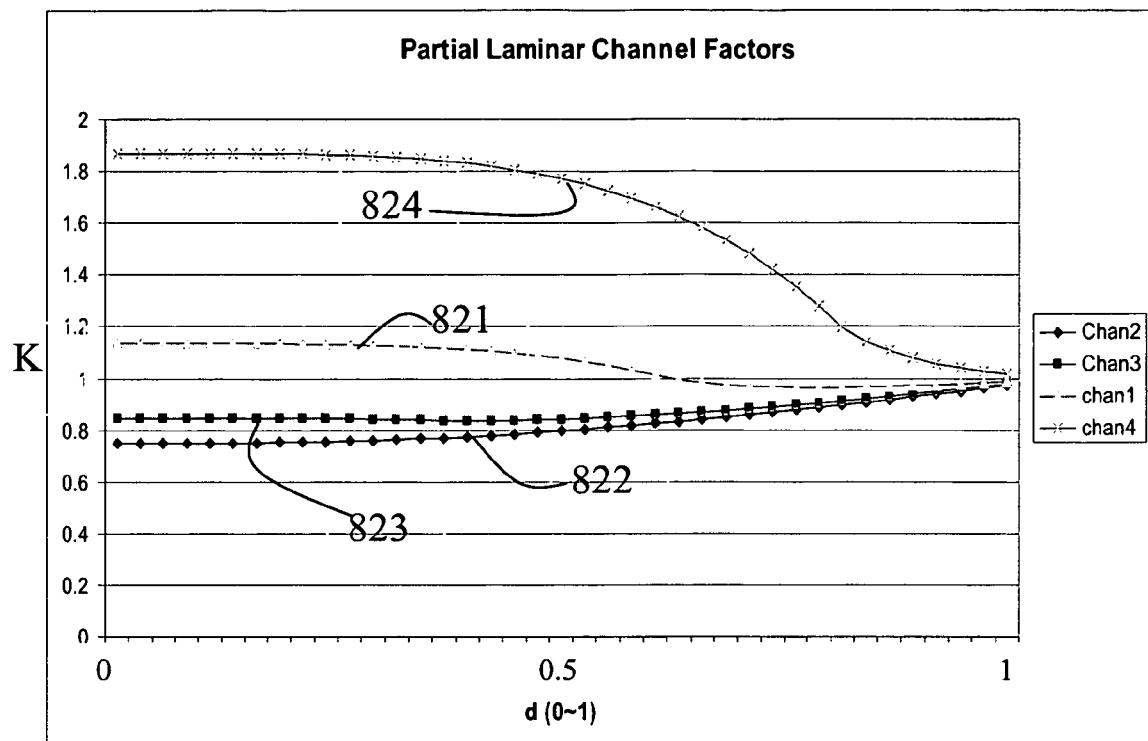
FIG. 8 shows a set of derived one-dimensional partial laminar flow K curves in accordance with one embodiment of the present invention.

For illustration purposes, two sets of one-dimensional arrays sampled from the two-dimensional arrays with known channel levels are shown in FIG. 7 and FIG. 8. FIG. 7 shows turbulent flow K factors as functions of N. The four curves 721-724 correspond to the four different paths of channels 1-4, and are obtained by looking up the two-dimensional arrays in FIG. 5 for the four specific h/R values. For example, the curve 722 is the K factors for the channel with a diagonal path, and is derived from FIG. 5 by setting an h/R=0.

FIG. 8 shows the K factors as functions of d, for a partially developed laminar flow. The four curves 821-824 correspond to the four different paths of channels 1-4, and are obtained by looking up FIG. 6 for curves having the specified channel levels h. When d=0, i.e., when the flow is pure laminar, the K value measured at the diagonal path 822 is 0.75. On the other hand, when d=1, i.e., when the flow is a plug flow, all K values converge at a value of 1.

In a typical straight pipe, transitional flow occurs when the Reynolds number is around 2300. This value may change depending on pipe conditions as well as the flow history. The presence of a flow conditioning device makes the flow profile modes even more unpredictable. Results from experiments have shown that a laminar flow can fully develop after passing through a flow conditioning device and before reaching the meter spool, if the Reynolds number is less than 1000. On the other hand, it is unlikely that a flow can re-establish a laminar profile at a Reynolds number greater than 5000 when a flow conditioning device is present. Based on these results, in accordance with one embodiment of the present invention, when the Reynolds number is between a lower limit, for example, 1000, and an upper limit, for example, 5000, a partial laminar model is used for fitting the flow profile. The lower limit of 1000 and upper limit of 5000 values will be used for illustration purposes in this description. One of ordinary skill in the art would appreciate that other limits may also be used without departing from the scope of the invention. For example, a wider range of Reynolds numbers, for example, from 500 to 10000, may be used to search for possible transitional profiles, if an accurate fluid viscosity is not available when performing measurements.

During a flow measurement, in accordance with one embodiment of the invention, an initial estimate of an average flow velocity, and consequently an estimate of a Reynolds number is made. If the Reynolds number Re>5000, it is likely that the flow is turbulent. The program then calculates an approximate value of N using Equation (5), based on the estimated Reynolds number Re. Within a range of estimated N, the program then searches the four curves in FIG. 7 for an N that gives the best set of K factors, that is, the four derived $V_{avg}=V_i*K_i$ values, based on the four measured $V_i$'s and the four $K_i$'s obtain from FIG. 7 using the N value, having the least statistical variance. This newly derived N value is more accurate than that calculated using Equation (5). The searched N value may be fed back to the program for iterations in order to have a even better accuracy. The curve fitting may be based on best fit with the least statistical deviation. Those of ordinary skill in the art will recognize that many types of curve fitting methods can be used without departing from the scope of the present invention. Also, the number of paths can be more than 4, or fewer than 4.

If on the other hand Re<1000, the program fits the measured data to a laminar profile, using appropriate equations. If Re is between 1000 and 5000, and it is not certain that if the flow is laminar, partial laminar, or turbulent, the program tries to fit the measured data using the three different profiles, and finds the best fit that in turn determines the true flow profile. If, for example, a partial laminar model best fits the data, the program determines a d value from FIG. 8. From the pipe centerline to a distance r=dR, the flow is "flat." Those skilled in the art will recognize that although the flow profile in the flat region is modeled using a constant velocity profile, more sophisticated models may be used to model a flow profile in the flat region that is different from a laminar flow profile.

During the run time of the flow meter, because accessing lookup tables is much faster than doing real-time integration calculations, the data processing time would be dramatically reduced and the flow meter can be configured on site with different path arrangements. However, those of ordinary skill in the art would appreciate that embodiments of the invention may use either pre-computed lookup tables or a program for real-time computation.

Figure 9:
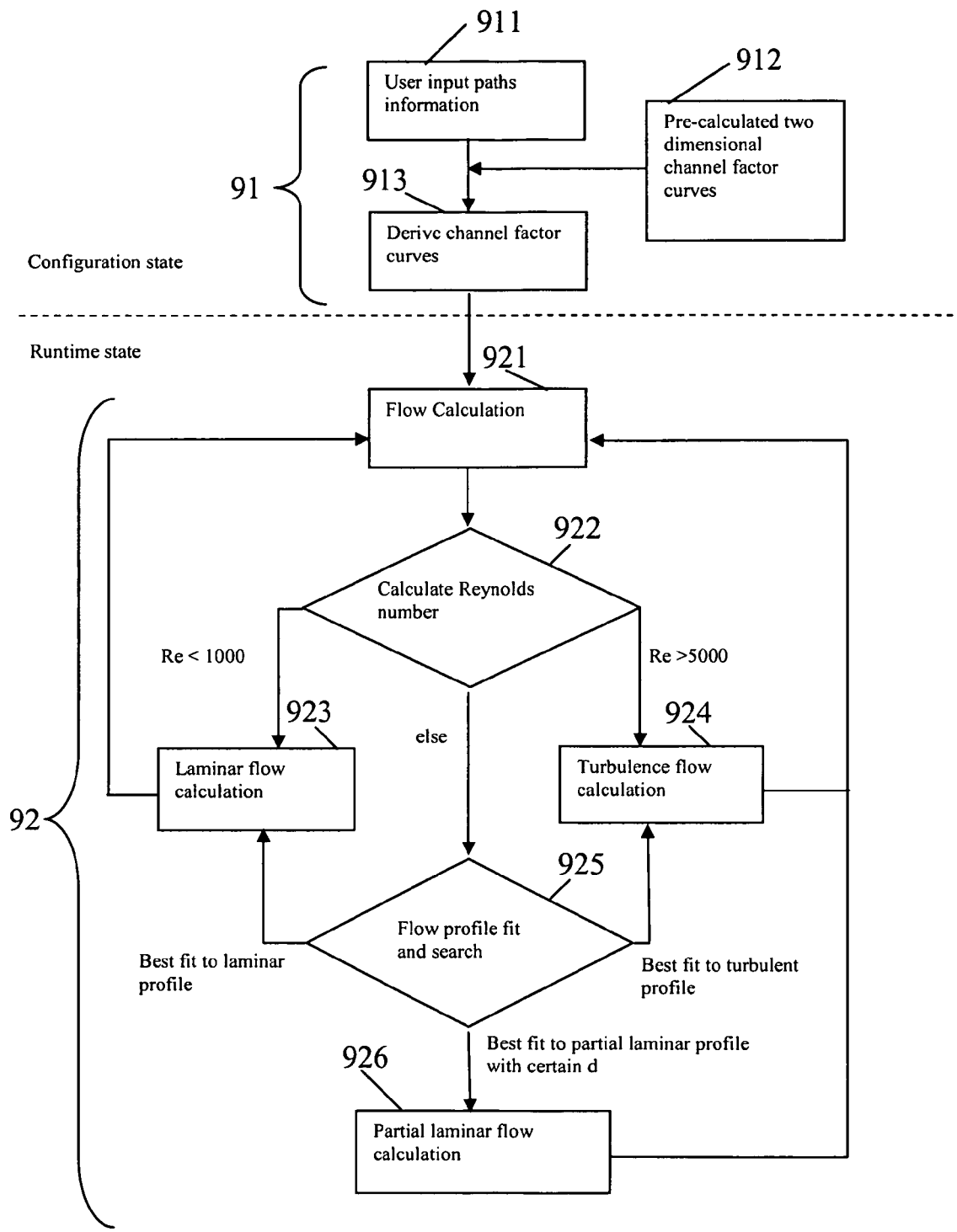
FIG. 9 shows a flow chart of a method for evaluating a flow profile in accordance with one embodiment of the present invention.

An method in accordance with one embodiment of the invention is illustrated in FIG. 9. The algorithm includes two states: the configuration state 91 and the runtime state 92. During the configuration state 91, in step 911, a user determines a unique combination of paths and inputs this information into a computer program. Using two-dimensional channel factor arrays pre-computed in step 912, the computer program derives, in step 913, the channel factor curves for the specific path configuration, as described above with reference to FIG. 7 and FIG. 8.

During the runtime state 92, the flow profile calculation component 921 first calculates a Reynolds number using Equation (6) and compares, in step 922, the Reynolds number with a pre-determined range. If the Reynolds number is less than a lower limit of the predetermined range, the lower limit in this exemplary case being 1000, the program does a laminar flow calculation in step 923. If the Reynolds number is greater than an upper limit of the predetermined range, the higher limit in this exemplary case being 5000, the program does a turbulent flow calculation in step 924. If the Reynolds number is within the predetermined range, in this exemplary case being between 1000 and 5000, the program searches for a best fit (step 925), among laminar profiles, turbulent profiles, and partial laminar profiles, and then executes steps 923, 924, or 926, accordingly. The above steps may be iterated until the desired accuracy of the results is satisfied.

Methods of the invention, as illustrated above, may be embodied in one or more computer programs suitable for field configuration over a large range of multi-path designs and flow conditioning device installations.

Figure 10:
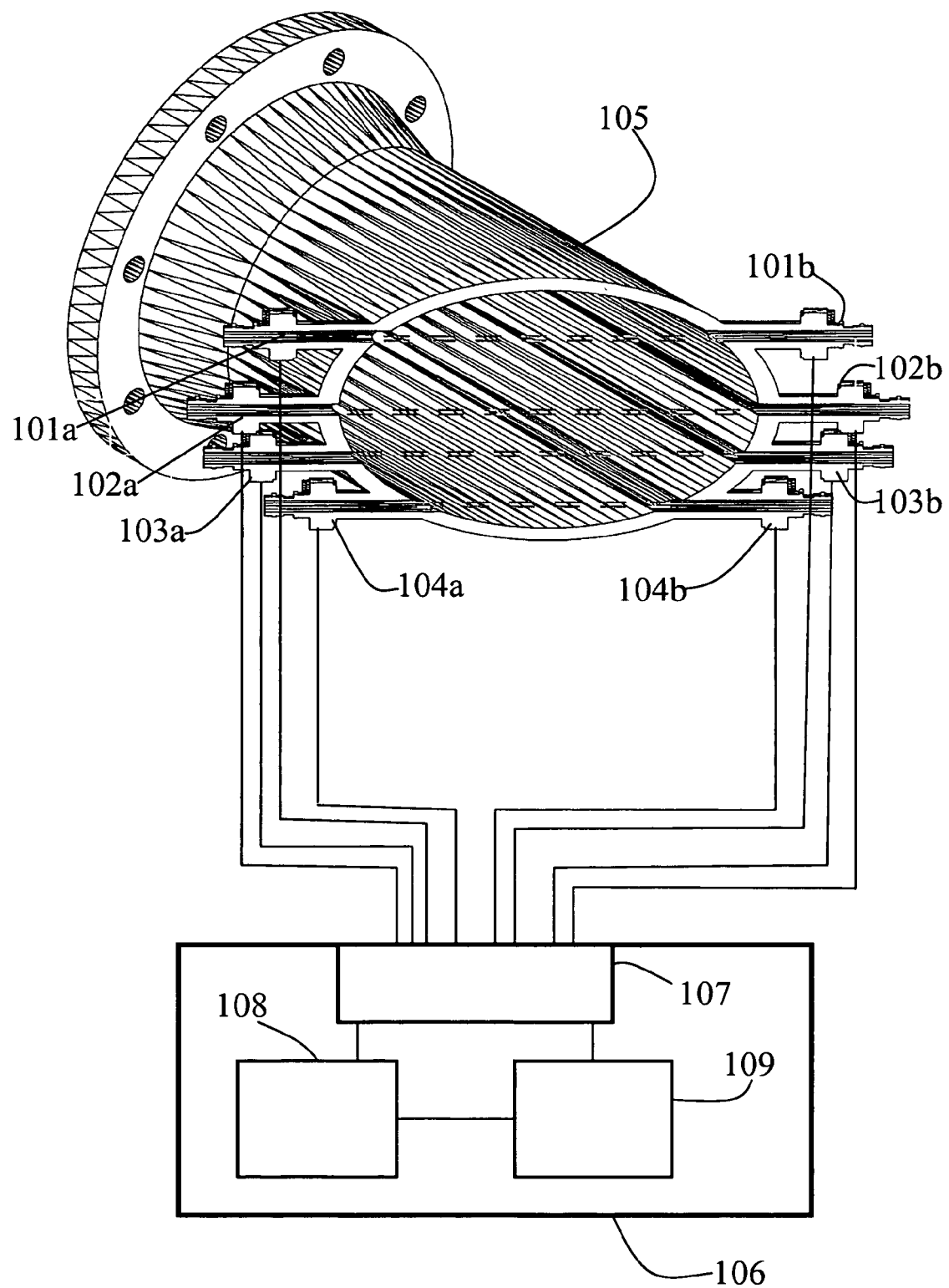
FIG. 10 illustrates an exemplary flow meter spool with an asymmetric distribution of ultrasonic transducers.

Some embodiments of the invention relate to a multi-path ultrasonic flow meter. Referring to FIG. 10, where an exemplary multi-path ultrasonic spool piece with an asymmetric path layout design is illustrated. In this embodiment, a 4-path meter spool is shown on a cross sectional view. Four pairs of ultrasonic transducers, 101*a* and 101*b*, 102*a* and 102*b*, 103*a* and 103*b*, 104*a* and 104*b*, are attached to the wall 105 of the pipe, each pair measuring the flow velocity of a specific path, such as the paths 41-44 in FIG. 4A. The transducer pairs are connected to a control unit 106, which may include an input/output control circuit 107, an electronic digital computer or a central processing unit (CPU) 108, and a computer readable medium 109. The computer readable medium (e.g., memory) 109 may store a program containing instructions to execute a method in accordance with embodiments of the invention. In some embodiments, the computer readable medium 109 may also store a database including the pre-computed results in the form of lookup tables. Those of ordinary skill in the art will recognize that many possible embodiments exist for the control unit 106, and the programs and/or databases may be stored or transferred using many different types of computer readable media, including, but not limited to, ROM, RAM, hard drive, floppy disk, CD, and flash drive.

As mentioned above, at lease two paths, each having a different distance from the pipe centerline, are required to solve a common flow profile. In practice, however, more than two paths are often necessary to average out the randomness in measurements and to improve the resolution of profiles buried in random processes. On the other hand, the number of ultrasonic paths is always limited by dimensional restrictions and by cost.

It is noted that in accordance with a preferred embodiment of the present invention, the multiple paths have an asymmetric distribution around the pipe centerline. Each of these paths has its distinctive channel level from the pipe centerline and provides unique information about the flow profile. In contrast, a meter spool with the same number of paths but using a symmetric path distribution would provide less information.

Advantages of the present invention include one or more of the following: (a) accurate and fast flow measurements covering a wide range of flow profiles, including laminar flow, turbulent flow, and partial laminar flow; (b) less dependence on the selection of a conditioning device, and a shorter-than-standard distance between the conditioning device and the ultrasonic measuring area may be sufficient, benefiting users in the installation and the cost; (c) faster response as a result of using pre-computed lookup tables; (d) fewer ultrasonic paths and transducers are needed as a result of the asymmetric configuration of paths.

While the invention has been described with respect to a limited number of embodiments, those skilled in the art, having benefit of this disclosure, will appreciate that other embodiments can be advised which do not depart from the scope of the invention as disclosed herein. Accordingly, the scope of the invention should be limited only by the attached claims.

What is claimed is:

1. A method for determining a velocity of a flowing fluid, comprising:
    estimating a Reynolds number for the flowing fluid;
    comparing the estimated Reynolds number with a selected range;
    determining the velocity of the flowing fluid based on a flow model, wherein the flow model comprises:
        a turbulent flow model, if the estimated Reynolds number is greater than an upper limit of the selected range,
        a laminar flow model, if the estimated Reynolds number is smaller than a lower limit of the selected range, or
        one selected from a partial laminar flow model, the turbulent flow model, and the laminar flow model, if the estimated Reynolds number is within the selected range; and
    outputting at least one of the estimated Reynolds number, the selected range, the velocity of the flowing fluid, and the flow model.

2. The method of claim 1, wherein the selected range is from 1,000 to 5,000.

3. The method of claim 1, wherein the selected range is from 500 to 10,000.

4. The method of claim 1, wherein the estimating the Reynolds number is based on a velocity measurement and a viscosity of the flowing fluid.

5. The method of claim 4, wherein the velocity measurement is made with an ultrasonic flow meter.

6. The method of claim 1, wherein the flow model is the turbulent model and the determining comprises determining a power law factor.

7. The method of claim 6, wherein the power law factor is determined by fitting a set of velocity measurements made with a multi-path ultrasonic flow meter to a set of curves relating channel factors to power law factors, wherein the set of curves are based on locations of multiple paths of the multi-path ultrasonic flow meter.

8. The method of claim 7, wherein the set of curves are selected from a database containing pre-computed curves.

9. The method of claim 1, wherein the flow model is the one selected from the partial laminar flow model, the turbulent flow model and the laminar flow model, and the determining comprises estimating a partial laminar factor that corresponds to a ratio of a non-laminar region to an entire flow region in a cross section of a fluid flow.

10. The method of claim 9, wherein the determining further comprises finding a best fit of velocity measurements to a model selected from the partial laminar model, the laminar model, and the turbulent model.

11. The method of claim 1, wherein the outputting comprises at least one of:
    graphically displaying at least one of the estimated Reynolds number, the selected range, the velocity of the flowing fluid, and the flow model;
    printing at least one of the estimated Reynolds number, the selected range, the velocity of the flowing fluid, and the flow model; and
    storing or transferring to computer readable media at least one of the estimated Reynolds number, the selected range, the velocity of the flowing fluid, and the flow model.

12. A computer readable medium storing a program having instructions for:
    determining a flow velocity of a fluid based on a flow model, wherein the flow model comprises:

a turbulent flow model, if an estimated Reynolds number is greater than an upper limit of a selected range, a laminar flow model, if the estimated Reynolds number is smaller than a lower limit of the selected range, or one selected from a partial laminar flow model, the turbulent flow model, and the laminar flow model, if the estimated Reynolds number is within the selected range; and outputting at least one of the estimated Reynolds number, the selected range, the flow velocity of the fluid, and the flow model.

13. The computer readable medium of claim 12, wherein the selected range is from 500 to 10,000.

14. The computer readable medium of claim 12, wherein the selected range is from 1,000 to 5,000.

15. The computer readable medium of claim 12, further comprising a database storing channel factors as a function of power law factors for the turbulent flow model and channel factors as a function of partial laminar factors for the partial laminar model.

16. The computer readable medium of claim 12, wherein the program further comprises instructions for calculating a channel factor as a function of a power law factor for the turbulent flow model and instructions for calculating a channel factor as a function of a partial laminar factor, which corresponds to a ratio of a non-laminar region to an entire flow region in a cross section of a fluid flow.

17. An ultrasonic flow meter, comprising:

a plurality pairs of transducers configured to form a plurality of measurement paths in a pipe, wherein the plurality of measurement paths are arranged asymmetrically relative to a centerline of the pipe; and a control unit, wherein the plurality of pairs of transducers are connected to the control unit, wherein the control unit comprises:

a processor and a memory, wherein the memory stores a program having instructions for:

determining a flow velocity of a fluid based on a flow model selected from a laminar flow model, a turbulent flow model, and a partial laminar flow model, wherein the flow model is selected based on comparing an estimated Reynolds number of the fluid with a selected range of Reynolds numbers; and outputting at least one of the estimated Reynolds number, the selected range, the flow velocity of the fluid, and the flow model.

18. The ultrasonic flow meter of claim 17, wherein the memory further stores a database of channel factors as a function of power law factors for the turbulent flow model and channel factors as a function of partial laminar factors for the partial laminar model.

19. The ultrasonic flow meter of claim 18, wherein the program further comprises instructions for calculating a channel factor as a function of power law factor for the turbulent flow model and instructions for calculating a channel factor as a function of a partial laminar factor for the partial laminar flow model and instructions for determining a best fit to measurements using one selected from the partial laminar flow model, the laminar flow model and the turbulent flow model.

* * * * *